June 22, 1926.
R. W. ATKINSON
1,589,505
CABLE JOINT STRUCTURE
Filed Oct. 9, 1924
FIG. I.
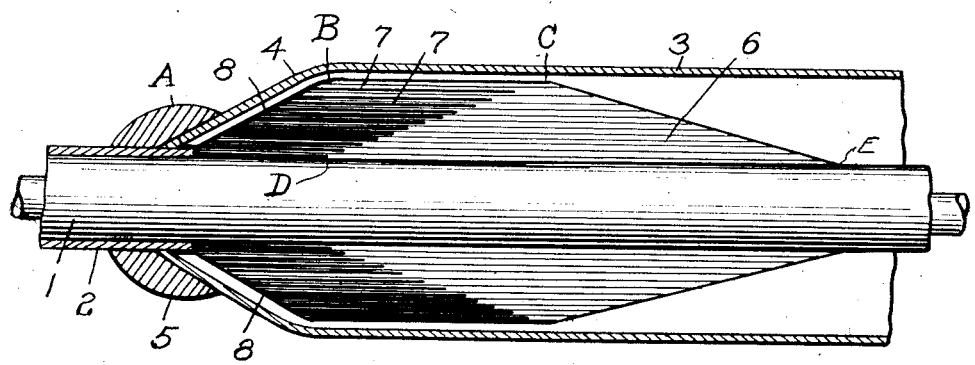
FIG. II.
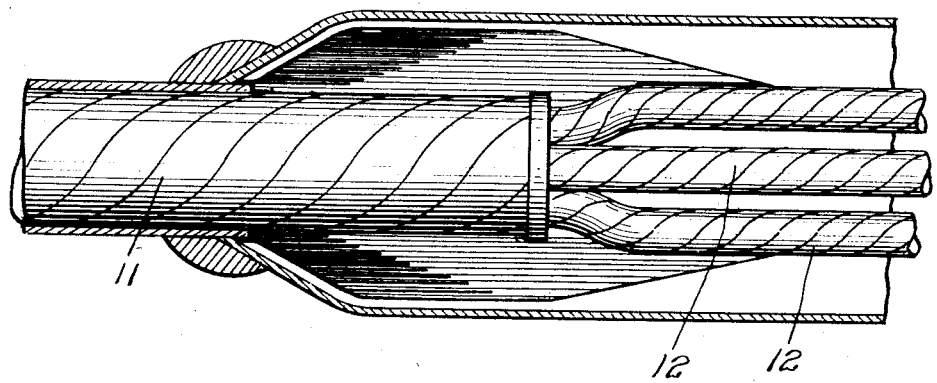
WITNESSES
J. Herbert Bradley.
Percy a English.
INVENTOR
Ralph W. Atkinson
by Christy and Christy
his attorneys Patented June 22, 1926.

1,589,505

UNITED STATES PATENT OFFICE.

RALPH W. ATKINSON, OF PERTH AMBOY, NEW JERSEY, ASSIGNOR TO STANDARD UNDERGROUND CABLE COMPANY, OF PITTSBURGH, PENNSYLVANIA, A CORPORATION OF PENNSYLVANIA.

CABLE-JOINT STRUCTURE.

Application filed October 9, 1924. Serial No. 742,591.

My invention relates to improvements in the structure of joints for electric cables.

In the accompanying drawings Fig. I shows diagrammatically and in medial and longitudinal section one end of a joint structure for a single-conductor cable in which my invention is embodied. Fig. II similarly shows my invention in application to the joint structure in a multiple-conductor cable.

The joint structure now generally used in the installation of high-tension cables includes an outer cylindrical casing of metal, surrounding the insulated splice or union of the cable conductors, and itself united at its ends to the metal sheath of the two lengths of cable which are united. This casing is of necessity greater in diameter than the lead sheath which elsewhere in the length of the cable surrounds the insulated conductors, and must at its ends be tapered to the diameter of the normal sheath. Abrupt change of field with consequent concentration of stress and danger of breakdown may be avoided by making the taper a relatively long and gradual one, but when this is done another difficulty is encountered, and to the overcoming of this difficulty my present invention is directed.

In making the joint the cable conductors are bared and united. The union is ordinarily covered with a tube of insulating material, or perhaps with wrapped-on paper tape, and the joint and the adjacent ends of the machine-insulated conductors are enveloped in a more bulky body of applied insulation, essentially solid in nature and ordinarily built of wrapped-on paper. The casing is then brought to position and secured, and then the casing is filled and its contents are permeated with an insulating compound which is, at least when applied, in liquid condition. It is impossible in the building of such a joint, but that there shall be spaces within the casing not occupied by the body of solid insulating material, and these spaces (otherwise vacant) are, when the joint is finished, filled with insulating compound alone, and it is such pockets of insulating compound which are the places of weakness of the joint as ordinarily constructed.

The insulating compounds so applied in liquid condition all have lower specific inductive capacity than has the cable insulation proper, and therefore when the cable is in service any pocket of free insulating compound within the joint is under considerable electrostatic stress,—higher stress than would obtain, were the compound equal in specific inductive capacity to the normal cable insulation.

Any free body of compound within the joint, forming part of the total wall of insulation which separates the conductor from the joint casing, tends to assume a burden of stress which is disproportionately greater than its relative thickness.

It is a peculiarity of liquid insulating materials that their specific breakdown strength decreases quite rapidly as the thickness increases.

In Fig. I of the drawings, 1 is the insulated core and 2 is the lead sheath of a length of cable, 3 is a joint casing, and this casing is at its ends tapered, as indicated at 4, and united by wiped-solder joint 5 to cable sheath 2.

If with Fig. I in view, the details of structure in which my invention is found be disregarded, and if it be assumed that all the space within the joint casing and surrounding the conductor is filled with free insulating compound, then tests would show that the specific breakdown strength of the compound would decrease from point A to point B, as the thickness of the mass increased. This condition then, under the circumstances assumed, obtains: as we proceed from A to B the voltage stress upon the layer of oil (insulating compound) increases; the depth of the stressed oil (in the case supposed) increases; and, since the specific breakdown strength of the compound decreases with increase in depth of the stressed layer, a point may be reached, and within the range of practical conditions is reached, where the compound becomes overstressed and breaks down. This point of breakdown will lie somewhere between A and B, the exact place being related to the particular shaping of the reduced end 4 of the casing 3, and also of the inner limiting surface of the layer of free compound.

Or, again, the initial breakdown of the layer of compound may so reduce the strength of the joint in longitudinal direction that breakdown may occur, from the conductor at the point where it has been bared (even though wrapped again), and over the surface of the machine-laid insulation exposed by cutting away preparatory to making the joint, to the lead sheath.

Consideration of these matters leads to the manifest conclusion, that it would be advantageous to fill the joint, and particularly this end portion of the joint where dangerous stresses develop, with solid insulating material, as distinguished from the liquid or viscid material commonly used. But this is practically impossible to do; this tapered end of the space within the joint casing can not be filled so neatly and accurately with solid insulation, that spaces will not remain between the body of insulation and the inner wall of the casing. When then the otherwise finished joint is filled with insulating compound, such spaces will be filled with insulating compound alone, and the pockets of free compound so constituted are points of weakness.

I avoid the difficulties of the nature indicated by adopting within the joint casing the structure particularly shown in the drawings.

At the ends of the joint structure where the joint casing tapers to the diameter of the cable sheath the conductor within is wrapped with paper or other insulating material. This body 6 of wrapped-on insulation is of course laminate in structure. It is built out to be but slightly less in diameter than the space within the joint casing which contains it, and its outer face beneath the tapered end 4 of the joint casing and between the points A and B is correspondingly tapered.

It has heretofore been proposed to apply to the outer surface of this tapered body of wrapped-on insulation an integument of metal electrically continuous with the cable sheath; but there are practical difficulties in the way of the successful carrying out of the proposal to achieve the ends which I have in view. It is difficult to apply a metal integument to the tapered end of wrapped-on paper insulation, and it is difficult to shape a so-applied integument to the underlying body with such closeness that no spaces will be left beneath the integument and between the integument and the surface to which it is applied—spaces which in the finished article form pockets of free compound. My invention overcomes the difficulties attendant upon this proposal. And I turn from this digression to resume the description of the structure of my invention.

In the wrapping on of the paper or equivalent material of which the body 6 of insulation is built, inlays 7 of metal foil are intercalated. When the body of insulation has been built to the desired thickness, the wrapping on is interrupted, and the inlay of metal foil is laid on to constitute a cylinder 7. The wrapping is recommenced upon the so laid-on metal cylinder. These inlays of foil divide the body 6 of insulation into layers, and the layers so formed are, according to best practice, of increasing thickness from the innermost to the outermost, the range of actual thickness being usually from one sixteenth to one quarter of an inch. The inlays of foil are all of them in electrical continuity with the cable sheath 2, through their exterior continuation 8. The extent of the inlays longitudinally of the joint is progressive, as shown, the extent of the innermost being least, and of the outermost greatest. The foil structure as a whole extends well beyond the region A—B, which otherwise is a region of weakness. The extreme ends of these intercalated layers 7 lie in a tapered arrangement, as indicated at D—C, Fig. I. It will be perceived that, electrically considered, the surface D—C is the bounding surface of the body of insulation surrounding the conductor. The reason why it is best practice so to proportion the parts that the layers of insulation defined by the inlays of metal shall be of minimum thickness inwardly and shall be of increasing thickness from the innermost to the outermost, is that the stresses are greatest at the surface of conductor from which point outwardly they diminish in intensity. The extreme ends of the inlays lie within and define a conical surface and by the grading of the thickness of the layers a continuous conical surface is more fully approximated where strain is greater than where strain is less. And by this provision maximum protection is achieved with minimum expenditure of material.

The characteristic feature of the structure described is this: the insulated conductor projecting beyond the end of the cut-away cable sheath is surrounded by a succession of concentrically arranged cylinders of conducting material; these cylinders are brought into electrical continuity with the cable sheath; the cylinders extend successively, from innermost to outermost, to progressively greater distances longitudinally of the conductor, from the point where it emerges from the lead sheath; the spaces between these concentric cylinders are filled with insulating material. And in this insulating material the undesirable characteristic of liquid insulation (described above) is not found.

It will be perceived that these intercalated inlays of metal foil, in electrical continuity with the cable sheath, limit throughout their extent the field of dielectric stress. And the body of insulation to which the field of stress is so limited, will be perceived to be solid insulation, or, more accurately speaking, wrapped-on tape of impregnated paper, or equivalent material. This is strong insulating material, not as subject to breakdown, as is a layer of free insulating compound. And it will be perceived that the insulating compound which otherwise fills the casing constitutes a free layer of insulation only externally of the foil structure, where it is not under stress. There is no stressed space filled with insulating compound alone in the taper of the casing.

This body 6 of wrapped-on paper underlies the tapered portion 4 of the joint casing, and preferably extends, as shown, some distance beyond the taper. But it is not necessary, for the attainment of my ends, nor is it ordinarily feasible, that this carefully prepared envelope of wrapped-on insulation shall fill the joint casing from end to end. Usually it would be impracticable to build this envelope in the field so as to fill the whole of the joint casing. Accordingly, it will be perceived that the remote end of this envelope 6, the right-hand end as seen in the drawing, is, beyond the point B, reversely tapered, from C to E.

The joint casing 3 containing the spliced conductor is, when otherwise completed, filled with insulating compound, in usual manner. The foil may of course be made perforate, for the passage of insulating compound in the filling operation.

I have spoken of the inlays introduced into the body of wrapped-on insulation, as metal foil, and ordinarily metal foil will be found to be serviceable. It will of course be understood that the desired characteristics of these inlays are that they shall be of conducting material and that they shall be closely shaped to the body of solid insulation which they cover. Any material which meets these requirements may be used, and will be within the field of my invention. Foil has the value of being easily shaped, but it does not on that account exclusively occupy the field. As is well known to the art, fine wire netting is serviceable in many places, equally with foil, and it is serviceable here. And netting has the added advantage of being in its nature permeable by insulating compound.

I have in the foregoing specification shown and described the invention in application to a single-conductor cable. The cable engineer will understand that the invention is applicable to cable-joints generally, whether of single-conductor or of multiple-conductor cables. When lengths of multiple-conductor cable are to be joined, the lead sheath is first cut away, just as is the case with a single-conductor cable, leaving an essentially cylindrical body. The spreading of the component insulated conductors occurs only at an interval beyond the end of the lead sheath, and through this interval the essentially cylindrical body is undisturbed. The joint of my invention, described above, may, as will be perceived, be applied to the multiple-conductor cable without change, inasmuch as the structure in which the invention particularly resides will surround the essentially cylindrical portion of the bared cable. This is diagrammatically indicated in Fig. II, where the tapered end of the joint casing and the wrapping with intercalated metal layers are shown surrounding the cylindrical body 11 of the unsheathed cable. At a more remote point the cylindrical shape of the cable body is destroyed in the spreading of the component conductors 12.

I claim as my invention:

1. A joint structure for an insulated and metal-sheathed electrical cable including in combination with a cable end from which the sheath has been cut back exposing the insulation-enveloped conductor, of a joint casing with tapered end secured at its end to the cable sheath adjacent the cut-back end thereof and surrounding the insulation-enveloped conductor where by the cutting away of the sheath it has been exposed, a body of solid insulation surrounding the insulation-enveloped conductor within the tapered end portion of the joint casing, and a cylinder of metal coaxially disposed with respect to the cable, embedded in said body of solid insulation and overlying the portion of the body of insulation within it to the exclusion of open spaces, such cylinder of metal, otherwise isolated, being electrically continuous with the adjacent cut-back end of the cable sheath.

2. A joint structure for an insulated and metal-sheathed electrical cable including in combination with a cable end from which the sheath has been cut back exposing the insulation-enveloped conductor, of a joint casing with tapered end secured at its end to the cable sheath adjacent the cut-back end thereof and surrounding the insulation-enveloped conductor where by the cutting away of the sheath it has been exposed, a wrapped on body of insulation surrounding the insulation-enveloped conductor within the tapered end portion of the joint casing, and a cylinder of metal coaxially disposed with respect to the cable embedded in said wrapped-on body of insulation, such cylinder of metal otherwise isolated being electrically continuous with the adjacent cut-back end of the cable sheath.

3. A joint structure for an insulated and metal-sheathed electrical cable including in combination with a cable end from which the sheath has been cut back exposing the insulation-enveloped conductor, of a joint casing with tapered end secured at its end to the cable sheath adjacent the cut-back end thereof and surrounding the insulation-enveloped conductor where by the cutting away of the sheath it has been exposed, a body of solid insulation surrounding the insulation-enveloped conductor within the tapered end portion of the joint casing, and two cylinders of metal unequal in diameter coaxially disposed with respect to the cable, embedded in said body of solid insulation, such cylinders of metal being electrically continuous with the cable sheath, the cylinder of greater diameter extending from the cut-back end of the cable sheath longitudinally within the casing to greater distance than the cylinder of less diameter.

4. A joint structure for an insulated and metal-sheathed electrical cable including in combination with a cable end from which the sheath has been cut back exposing the insulation-enveloped conductor, of a joint casing with tapered end secured at its end to the cable sheath adjacent the cut-back end thereof and surrounding the insulation-enveloped conductor where by the cutting away of the sheath it has been exposed, a body of solid insulation surrounding the insulation-enveloped conductor within the tapered end portion of the joint casing, and a plurality of cylinders of metal unequal in diameter coaxially disposed with respect to the cable and embedded in said body of solid insulation to the exclusion of internal open spaces, such cylinders of metal otherwise isolated within such body of solid insulation being electrically continuous with the adjacent cut-back end of the cable sheath, and such cylinders from the innermost outwardly extending to successively greater distances longitudinally within the casing, the extreme ends of said cylinders lying within and defining a conical surface which extends beyond the taper to which the end of the casing is shaped.

5. A joint structure for an insulated and metal-sheathed electrical cable including in combination with a cable end from which the sheath has been cut back exposing the insulation-enveloped conductor of a joint casing with tapered end secured at its end to the cable sheath adjacent the cut-back end thereof and surrounding the insulation-enveloped conductor where by the cutting away of the sheath it has been exposed, a body of solid insulation surrounding the insulation-enveloped conductor within the tapered end portion of the joint casing, and a plurality of cylinders of metal unequal in diameter coaxially disposed with respect to the cable and embedded in said body of solid insulation, such cylinders of metal being electrically continuous with the cable sheath, such cylinders defining successive layers of the body of insulation within which they are embedded, the layers of insulation so defined being of minimum thickness inwardly and increasing in thickness from the innermost to the outermost.

In testimony whereof I have hereunto set my hand.

RALPH W. ATKINSON.